Nov. 7, 1944.  J. KINDERVATER  2,362,279
ATTACHMENT FOR PNEUMATICALLY TIRED WHEELS
Filed April 21, 1942  3 Sheets-Sheet 3
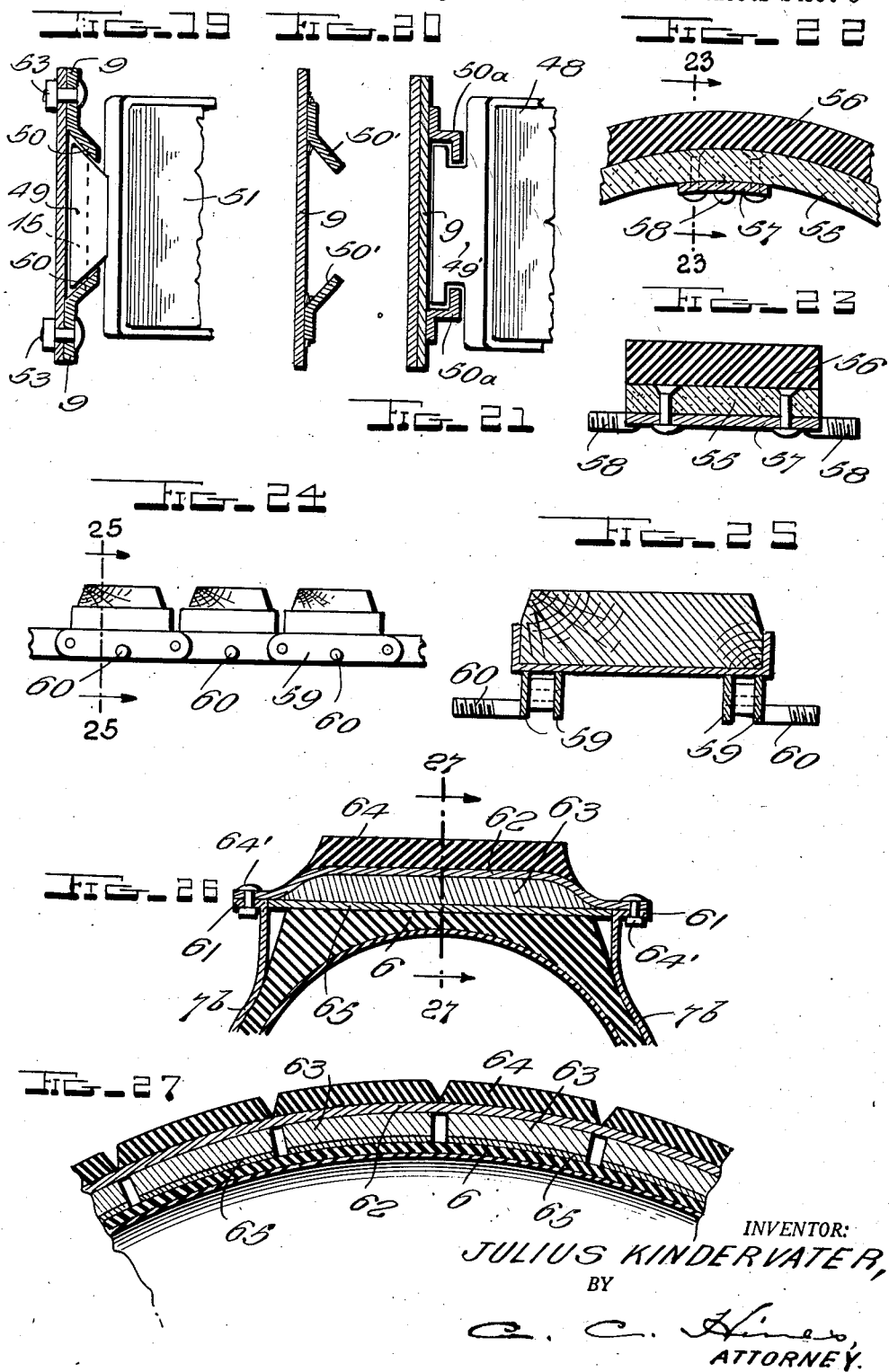
INVENTOR:
JULIUS KINDERVATER,
BY
C. C. Hines,
ATTORNEY.

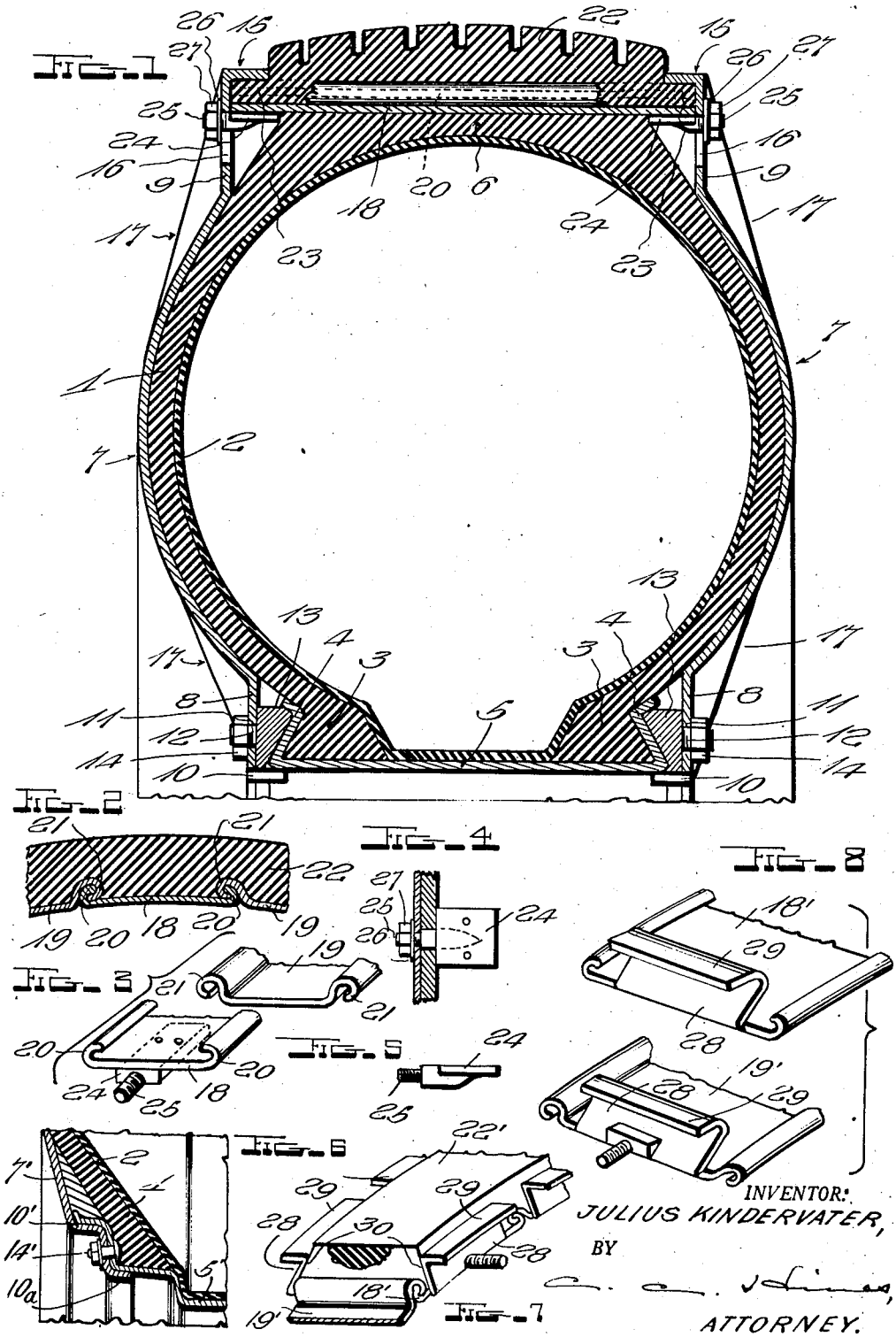

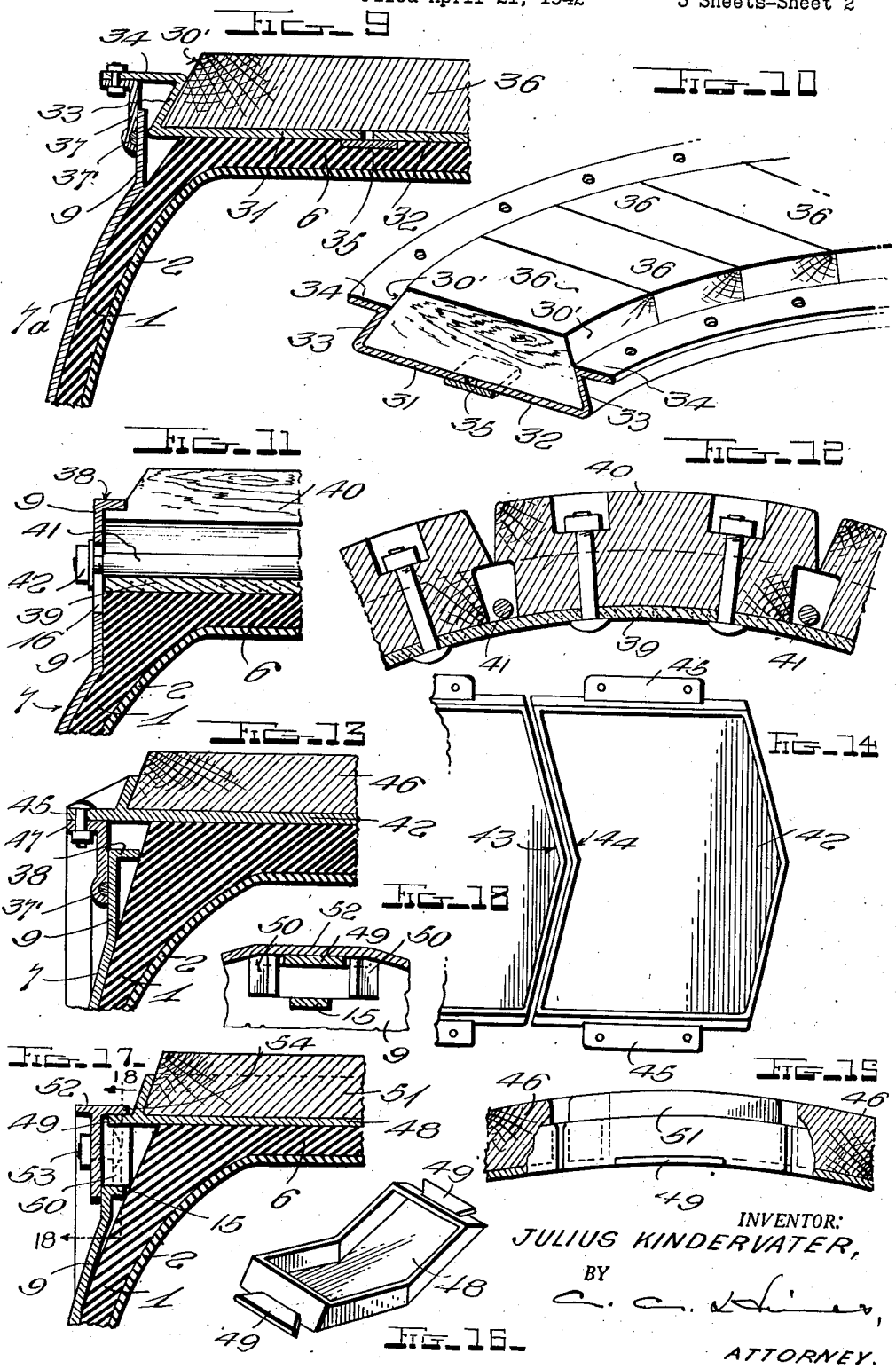

Patented Nov. 7, 1944

2,362,279

UNITED STATES PATENT OFFICE 2,362,279

ATTACHMENT FOR PNEUMATICALLY TIRED WHEELS

Julius Kindervater, Richmond, Va.

Application April 21, 1942, Serial No. 439,868

21 Claims. (Cl. 152—185)

This invention relates to improvements in pneumatic tires for automobiles and other vehicles, and particularly to a combination puncture-proof armor and salvage and safety attachment for application to pneumatic tires from which the tread surface has been worn down to an unsafe point, whereby the worn tire may be kept in service.

Conventional pneumatic tires are formed of woven fabric layers vulcanized together with rubber to withstand the load and internal pressure and capped or treaded with live rubber. When the tread is worn down to or beyond the fabric the tire may be recapped or retreaded for further use if the tire is in generally good condition. It frequently happens, however, that the side walls of the tire are damaged when a puncture occurs, the flattening effect tending to break the fabric and render the tire unsuitable for capping or retreading, and in such cases the inner tube is liable to be pinched and damaged beyond repair, due to riding of the wheel on its rim when the tire is deflated, particularly when the pneumatic tire has a weakened tread worn down close to the fabric.

The general object of my invention is to provide an attachment for pneumatic tires which is designed to prolong the life of a worn tire, to effect the conservation of rubber, and to provide means whereby tire punctures are eliminated.

Another object of the invention is to provide an attachment of the character described which may be applied to an ordinary pneumatic tire and wheel rim with no change in the construction of the tire and little or no change in the construction of the rim, and whereby a worn tire may be maintained in continuous service.

Still another object of the invention is to provide an attachment of the character described whereby a tire with a worn tread or broken fabric may be supported and utilized as a resilient backing for a supplemental tread, the only replacements necessary being to periodically apply new tread portions to a tread base when occasion requires.

Still another object of the invention is to provide an attachment of the character required which will permit the application to a wheel and tire of a complete supplemental tread, as such, or of a tread base to which new tread surfaces may be applied when needed, in a ready and convenient manner.

Still another object of the invention is to provide an attachment which will enable the use of a tread formed of rubber or other materials, in such a manner that, if rubber is used, a conservation in the use of rubber over that required for recapping or retreading will be effected.

Still another object of the invention is to provide a construction of attachment of the character described which, in the event of deflation of the tire, will present supporting surfaces on which the wheel may ride to prevent injury to the tire and liability of loss of control of the car under such conditions.

With these and other objects in view, the invention consists of the features of construction, combination and arrangement of parts, hereinafter fully described and claimed, reference being had to the accompanying drawing, in which—

Fig. 1 is a transverse section through a tire and wheel rim showing the application thereto of one form of attachment embodying my invention.

Fig. 2 is a vertical longitudinal section through a portion of the substitute tread.

Fig. 3 is a view of a pair of the hinged tread plates.

Fig. 4 is a detail section through one of the guard plates showing the mode of mounting one of the tread plate lugs thereon.

Fig. 5 is a detail view of one of the tread plate lugs.

Fig. 6 is a sectional view through a portion of a tire, wheel rim and guard plate and showing a preferred manner of attaching the guard plate to the wheel rim.

Fig. 7 is a perspective view showing adjoining tread plates of modified form as adapted for the use of an endless rubber tread or wooden tread blocks.

Fig. 8 is a view of a pair of the hinged tread plates shown in Fig. 7.

Fig. 9 is a sectional view through a portion of a tire, guard plate and tread, showing a modified form of tread plates and mode of mounting the same on the guard plates.

Fig. 10 is a perspective view of a portion of the tread shown in Fig. 9 and tread blocks mounted thereon.

Fig. 11 is a view similar to Fig. 9 showing still another form of tread for supporting wooden tread blocks and a modified mode of mounting the same on the guard plates.

Fig. 12 is a longitudinal section through a portion of the tread shown in Fig. 11.

Fig. 13 is a view similar to Figs. 9 and 11 showing still another modified form of tread and mode of mounting the same on the guard plates.

Fig. 14 is a plan view of two adjoining tread members or plates of the form shown in Fig. 13.

Fig. 15 is a longitudinal section through a portion of the tread shown in Fig. 13 showing in dotted lines and dot and dash lines, respectively, the normal line of depression of a tread block and its line of depression when the tire becomes deflated.

Fig. 16 is a view of one of the tread plates or sections shown in Figs. 13, 14 and 15.

Fig. 17 is a view similar to Fig. 13 showing still another modified form of means for mounting the tread on the guard plates.

Fig. 18 is a detail section on the line 18—18 of Fig. 17.

Fig. 19 is a transverse section on the line 19—19 of Fig. 17.

Fig. 20 is a detail view showing a modified form of guide flange or wing for the dove-tailed guide flange of a tread plate or section.

Fig. 21 is a sectional view showing a further modified form of guide connection between a tread plate or section and a retainer ring.

Fig. 22 is a longitudinal section through a portion of a tread comprising a fabric base member and a tread structure mounted thereon.

Fig. 23 is a section on the line 23—23 of Fig. 22.

Figs. 24 and 25 are views showing a tread construction including an endless link chain.

Fig. 26 is a transverse section through a portion of a tire showing still another modified form of attachment applied thereto.

Fig. 27 is a section on line 27—27 of Fig. 26.

Referring now more particularly to Figs. 1 to 5, inclusive, of the drawings, I designates the outer shoe or casing of a conventional pneumatic tire, and 2 the inner tube thereof, said shoe being provided with the usual retaining beads 3 to engage the retaining flanges 4 on the tire carrying wheel rim 5, which may be of any of the types in common use. The shoe I is provided with the usual rubber tread 6. The drawings show the application of the invention to a tire, the tread 6 of which is worn down to the fabric line, so as to ordinarily require recapping or retreading in order to maintain the tire in serviceable condition, assuming that it is otherwise in good condition for the purpose. My invention is designed for application to the wheel rim and a tire having a tread so worn down, to adapt the tire to be used without recapping or retreading, and which supports the tire and provides a substitute tread of a durable character and adapted when worn so as to be no longer serviceable to be replaced in a ready, convenient and inexpensive manner. The tread of the attachment is adapted to move inwardly and outwardly with the tire tread under load and air pressures in the usual manner, and is also adapted, in the event of deflation of the tire, to provide a surface on which the wheel may run without damage to the tire shoe and inner tube and without liability of the loss of control of the vehicle by the driver such as might ordinarily occur due to a collapsed tire.

The attachment comprises a supporting casing formed of a pair of endless or annular guard plates 7 arranged at opposite sides of the tire. Each of these guard plates has a body portion conforming in contour to the outer surface of the tire shoe between its bead and tread portions and terminating in straight inner and outer portions 8 and 9, respectively, which are arranged in parallel relation to the vertical center of the wheel. The portions 8 of these plates are provided with flanges 10 to extend under the rim 5 and with openings 11 adjacent to said flanges for the reception of the threaded stems or bolt portions 12 of bracket members or lugs 13 forming abutments for said portions 8 of the plates, said brackets or lugs being welded or otherwise fastened to the rim, nuts 14 being applied to said stems or bolt portions of the lugs to hold the plates fastened to the rim. The plates 7 support the side walls of the tire against outward deflection beyond their normal position of maximum expansion. The portions 9 of the plate are provided with inwardly extending flanges 15 which overhang the outer sides of the tread 6 and are formed with slots 16 lying inside said flanges and spaced therefrom. The portions 8 and 9 of each plate 7 are preferably reinforced by ribs 17 arranged at suitable intervals around each plate and welded to or press formed thereon. The plate 7 may, in practice, be formed of metal, or any suitable and durable composition material, pressed, cast or otherwise shaped.

The outwardly extending portions 9 of the plate 7 support a substitute tire tread comprising an inner tread base or carrier and an outer tread surface of suitable construction and material. The tread base or carrier shown in Figs. 1 to 5, inclusive, consists of an annular link band formed of alternately arranged tread plates or sections 18 and 19 and which extends around the tread surface 6 of the tire shoe. The tread plates or sections 18 and 19 are of channeled form and provided respectively along their meeting transverse edges with inturned and outturned hooked flanges 20 and 21, respectively, which are interengaged with each other to pivotally connect the tread plates or sections together. The channels in the tread plates are open at their sides, and at their sides the flanges extend under the rim flanges 15 of the guard plates 7, whereby the tread carrier is held in position against outward displacement. The tread carrier so formed carries a tread surface 22 which, as shown in Figs. 1 and 2, is continuous or in the form of a band of rubber or other resilient material, elastically or otherwise held in the channels of the tread plates or sections. This tread surface is provided with outwardly extending side flanges 23 which engage under the rim 15 to hold the tread band or surface from any possibility of outward displacement. Holding lugs 24 are riveted or welded to the tread plates 18, or to both the tread plates 18 and 19 if desired, and have threaded stems or bolt portions 25 which project outwardly through the slots 16 and are provided with lock washers 26 and nuts 27 to detachably connect the tread carrier with the guard plates in such manner as to allow the tread carrier and tread surface to move inwardly and outwardly with the tire tread under normal load and air pressures to give the desired cushioning effect in the running of the wheel. The bolts 25 in such movements ride in the slots 16 which are of such length as to allow the tread to have a normal range of inward cushioning movement under loads. In such range of movement the outer surface of the tread 22 is maintained beyond the outer surfaces of the rim flanges 15. If, however, the tire should become deflated to an abnormal extent, due to decrease of air pressure within the tire beyond a predetermined point, the tire will be supported by the plates 7 against undue depression or collapse. At the same time inward movement of the tread beyond the rim surfaces 15 will be prevented, and such rim surfaces will come into play to form surfaces on which the wheel may run to prevent injury to the tire or collapse of the tire and pinching of the inner tube. By this means a wheel having a deflated tire will be maintained in running condition until repairs can be made or normal pressure conditions restored and loss of control of the vehicle due to tire collapse prevented.

It will be understood from the foregoing that by simply providing means of attachment of the plates 7 to any ordinary wheel rim, my improved attachment may be applied to a pneumatic tired wheel to support a tire which is ordinarily no longer serviceable owing to the wearing down to the fabric point of its tread, and so that a substitute tread may be provided to maintain the worn tire in service without the necessity of recapping or retreading the tire, and that, whenever the substitute tread is worn down a new substitute tread may be readily applied for use in its place. By this means the necessity of discarding the worn tire is avoided, as well as the necessity of providing a complete new tire, so that a conservation in the use of rubber for tiring wheels may be effected, while the pneumatic cushioning action of the tire in service is preserved. If in the construction of the attachment a rubber tread, such as 22, is employed it will be only necessary, when one tread is worn, to substitute another tread formed of a comparatively small amount of rubber, as compared with that employed in a new tire, so that great economy in the cost of maintaining pneumatic tired wheels in service will also be effected. It will further be evident that a safe construction of tire is provided for the running of the vehicle at even high speeds, since the tire is firmly supported in position and the tread portion thereof is securely held in working position against any possibility of displacement under all normal running conditions.

In Fig. 6 I have shown a preferred manner of attaching each guard plate 7' to a certain form of rim 5' in which the plate is formed with an offset portion 10' as well as a flange 14 to engage portions of the rim and in which a portion of the plate intermediate the flange and offset portion is apertured for passage of button head fastening bolts 14' spot welded to the rim.

In place of the continuous tread band 22 I may employ tread blocks of rubber, wood or other suitable materials applied to the tread plates, as hereinafter described.

In Figs. 7 and 8 I have shown channeled tread plates 18', 19' generally similar in form to the tread plates 18, 19, but which are provided with dove-tailed or undercut side walls 28 having outstanding flanges 29. These walls form keepers to receive the beveled or dove-tailed side edges 30 of a cast rubber tread band 22', as shown in Fig. 7, or similar edges on rubber or wooden tread blocks applied to the tread plates. The flanges 29, when the tread plates 18', 19' are used with the form of guard plates shown in Fig. 1, may either overlie or underlie the flanges 15 of the guard plates, or they may be used with guard plates from which the flanges 15 are omitted, in which case the flanges 29 will close the spaces between the tread plates and the portions 9 of the guard plates in such manner as to allow the edges of the portions 9 to operate as riding surfaces in the event of the deflation of the tire.

Figs. 9 and 10 show the use of a tread carrier formed of two endless rings 31, 32 provided with dove-tailed or undercut side walls 33 having outwardly extending flanges 34. The rings are united at intervals by clip plates 35 welded thereto, or welded to one ring and suitably fastened to the other ring. The rings form a channel in which are fitted tread blocks 36 of wood, rubber or other material, which blocks are clamped between the rings and provided with beveled or dove-tailed side edges 30' engaging in the keeper recesses formed by the wall 33. Each guard plate 7ª in this embodiment of the invention is formed with a rim portion 9 devoid of the flange 15, and to the flange of each tread ring is secured a retaining ring 37. The outer edge of the body of the tread ring slidably engages the inner surface of the portion 9, while the ring 37 slidably engages the outer surface of the portion 9, thus mounting the tread carrier and tread blocks to move bodily or as a unit inwardly and outwardly under load and air pressures. As shown, the carrier rings 31, 32 seat on the worn tire tread 6, which is suitably flattened to adapt the carrier rings to bear on the surface 6 throughout its entire width, and the tread structure as a whole, except the rings 37, are applied to the tire when the latter is in deflated or partly deflated condition, after which the rings 37 are applied and the tire fully inflated to dispose the parts in the normal relative positions shown in Fig. 9. The tread surface will thus be supported for service use and for sliding movements inwardly and outwardly with the tread portion of the tire for cushioning actions in the normally inflated condition of the tire. In the event, however, that the tire should become deflated the flanges 34 will move inwardly under load pressure and rest against the rim edges of the portions 9 whereby the tread will be backed and supported to prevent collapse of and injury to the tire and tube. The rings 37 may be suitably formed to receive packing 37' to prevent entrance of dirt or moisture between the same and the guard plate portions 7.

Figs. 11 and 12 show a structure in which the guard plate portions 9 are provided with inwardly extending flanges 38 and in which the substitute tread comprises an endless ring or band 39 of a strong fabric to which are bolted, riveted or otherwise secured tread blocks 40 of wood, rubber or other material. The side edges of this carrier band extend under the flanges 39 and the blocks are pivotally connected at their adjacent ends, with clearance for freedom of motion, by transverse bolts 41 the ends of which extend under the flanges 38 and through slots 16 in the portions 7 and are fitted with nuts 42, whereby the carrier and tread blocks are held in position with the carrier band seated on the worn tire tread 6. With this construction the flexible band and blocks may move inwardly and outwardly with the tire tread, in which the blocks may normally move inwardly until their tread faces aline with the flanges 38. In the event that the tire should become deflated the flanges 38 will form tread surfaces to contact with the road surface and on which the wheel may ride to prevent injury to the tire, tube and tread.

In the structure shown in Figs. 13 and 14 the guard plates are of the general form shown in Fig. 11, each having a portion 9 and an inwardly extending flange 38, but the tread is formed of shallow pan-like plates or members 42, each having at one end a V-shaped convex end wall 43 and at its other end a V-shaped concaved end wall 44 and having at each side an outstanding flange 45. Tread blocks 46 of rubber, wood or other material are seated and secured in these tread plates or members. The convex end of each of the tread plates is received or nested in the concaved end of the next adjacent plate, to herringbone the plates into one another or to form a break-joint construction to avoid thump at each joint when road contact is made. To the flanges 45 are secured retainer rings 47, which ride on the outer faces of the guard plate portions 9, thus slidably mounting the tread structure on the guard plates for inward and outward movements with the tire tread. This construction avoids the necessity of employing bolts passing through any of the tread parts to secure the same to the guard plates. In the event that the tire should become deflated the flanges 45 will contact with the flanges 38 and prevent collapse of and injury to the tire, tube and tread structure. Fig. 15 shows the normal and deflated depression lines in such service actions.

Figs. 16 to 19, inclusive, show a structure in which the shallow, pan-like carrier tread plates or members 48 are or may be of the same construction as that shown in Figs. 13 to 15, inclusive, or wherein the members 48 may be of rectangular formation and independent of engagement with each other. These members 48 are provided at their sides with dove-tailed guide flanges 49 which are disposed between and slidably engage dove-tailed guideways formed by inclined guide flanges 50 on the guard plate portions 9. These flanges 50 are preferably formed by slotting and dividing parts of the portions 9 and bending the divided parts inwardly, as shown. The flanges 50 are disposed above or beyond the flanges 15 of the guard plates, so that the flanges 49 on the tread plates 48, which slide in the guideways so formed, are limited in their extreme inward movements by the flanges 15. Dove-tailed or otherwise suitably secured in the channeled or pan-like tread plates 48 are tread blocks 51 of rubber, wood or other material. Mounted upon each guard plate is a retainer ring 52 secured thereto by bolts 53 and arranged to close the slots formed by the formation of the guide flanges 50. Each of these rings 52 is provided with a flange 54 which closes the outer ends or portions of said slots and overhangs or lies outwardly beyond the flanges 49 of the tread plates 48, whereby the outward movement of the tread plates is limited and the tread members held in proper working position. The tread members are assembled in position and the retainer rings applied when the tire is deflated, after which the tire is inflated to service pressure, by which the flanges 49 of the tread members are brought into normal position in which they engage the flanges 54 of the retainer rings. By this construction the tread members may move inwardly and outwardly with the tire tread under normal service conditions. In the event that the tire should become deflated the inward movement of the tire and tread members will be limited by engagement of flanges 49 with flanges 15 and the flanges 54 will cooperate with the tread blocks to form a surface on which the wheel may ride, thus preventing collapse of and injury to the tire, tube or tread structure.

Instead of forming the guide flanges 50 in the manner described as integral parts of the guard plates, they may consist, as shown in Fig. 12, of separate pieces of metal 50' welded to the portion 9 of the guard plate. Also, as shown in Fig. 21, instead of using dove-tailed projections 49 on the tread plates, T-shaped flanges or projections 49' may be formed or provided thereon, as shown in Fig. 1, and these may move in a guideway formed by guide strips of Z-form or other suitable form, 50ª, secured to the portions 7 of the guard plates.

In Figs. 22 and 23 I have shown still another form of tread structure in which an endless tread carrier or base 55 is provided on which may be mounted and suitably secured an endless or sectional tread surface 56, of rubber, wood or other suitable material. This fabric carrier base may be provided at intervals with brackets or clip plates 57 riveted or otherwise fastened thereto, and carrying bolts 58 or other fastening members for attaching the same to the guard plates and serving the same function as the lug bolts 25, or of the guide flanges, such as flanges 49, for either fixedly or slidably securing the carrier base to the guard plates. I may also, as shown in Figs. 24 and 25, employ an endless band type of carrier base in the form of a link chain 59, the link members of which may be provided with bolts 60 or guide flanges to secure or slidably mount the chain on the guard plates. To the chain links may be applied tread plates of suitable form and carrying tread blocks or a tread band of suitable construction to provide a resilient or flexible tread surface.

In Figs. 26 and 27 I have shown a structure in which the portions 9 of the guard plates 7ᵇ are formed with outwardly projecting flanges 61 to which is applied a tread formed of an endless band 62 of rubber, fabric or other suitable flexible material to the inner face of which are applied backing plates or blocks 63 of any suitable material and to the outer face of which are secured renewable tread pads or blocks 64 of rubber or other suitable material. The side edges of the band 62 extend outwardly over the flanges 61 and are fastened thereto by rivets, bolts or other fastenings 64'. To the inner faces of blocks 63 are secured reinforcing plates or metal spacers 65 which rest on the tire tread 6 and sustain the tread to prevent the same from buckling or the flanges 61 from collapsing inwardly. In the event of the tire becoming deflated the plates 65 will wedge against portions 9 and hold the tread from collapsing. This construction allows new pads to be substituted for the pads 64 when worn out at small expense.

From the foregoing description, taken in connection with the drawings, the construction and mode of use of my novel and improved attachment for pneumatic tires will be readily understood and it will be seen that the invention provides an attachment which may be applied to a vehicle wheel rim and pneumatic tire having a worn down tread so that the tire will be supported and an efficient type of substitute tread surface provided, to adapt the worn tire to be kept in continuous service to perform the function of a cushioning medium. By this means a tire having weaknesses, such as would prevent it from being recapped or retreaded may be used, and the necessity in any case of recapping or retreading avoided, with a consequent conservation in the use of rubber. My attachment may be applied in a ready and convenient manner to the rims of vehicle wheels in service, or to special rims, and supplied with an approved form of tread surface at a low cost, less than the cost of a new tire and not exceeding the cost of recapping or retreading an old tire, and with the advantage that an old tire may be kept in service for an indefinite period by merely applying a comparatively inexpensive tread surface at comparatively long intervals. The construction of the attachment is such that it will be held securely on the wheel, so that the vehicle may be driven at high speed without liability of the tread becoming loose or causing loss of control of the vehicle. These and other advantages incident to my novel construction of tire attachment will be evident to those versed in the art without a further and extended description.

While the structures disclosed for purposes of exemplification are preferred, it will, of course, be understood that changes in the form, construction and arrangement of parts may be made within the scope of the appended claims without departing from the spirit or sacrificing any of the advantages of the invention.

What I claim is:

1. In a pneumatic-tired wheel, and in combination with a pneumatic tire and its channeled wheel rim having tire bead receiving flanges, annular side members for attachment to the rim conformably shaped and arranged to bear on and support the side walls of the tire against outward deflection, said side members having inner supporting portions facing said bead receiving flanges and having outer supporting portions disposed at opposite sides of the tread surface of the tire, spacing and fastening means being provided between the bead receiving flanges and the inner supporting portions of the side members and detachably fastening the same together, and a substitute tread for the tire supported by the outer supporting portions of said side members and arranged to seat against the tread surface of the tire.

2. In a pneumatically-tired wheel, and in combination with a pneumatic tire, and its channeled wheel rim having tire bead receiving flanges, annular side members for attachment to the rim conformably shaped and arranged to bear on and support the side walls of the tire against outward deflection, said side members having inner supporting portions facing said bead receiving flanges and having outer supporting portions disposed at opposite sides of the tread surface of the tire, lugs welded to the rim and bearing on the bead receiving flanges, bolts carried by the lugs and passing through the inner supporting portions of the side members, clamping nuts engaging said bolts and clamping the side members against the lugs, ribs on the side members reinforcing said inner and outer supporting portions, a substitute tread for the tire arranged to seat against the tread surface of the tire and mounted on said outer supporting portions of the side members so as to be movable inwardly and outwardly with said tread surface.

3. In a pneumatically-tired wheel, and in combination with a pneumatic tire and its channeled wheel rim having tire bead holding flanges, annular side members for attachment to the rim conformably shaped and arranged to bear on and support the side walls of the tire against outward deflection, a substitute tread for the tire mounted on said side members, means spacing the inner supporting portions of the side members from and detachably securing the same to the bead holding flanges, and means movably connecting the substitute tread with the outer supporting portions of the side members, said outer supporting portions of the side members having inwardly extending flanges for contact with the road surface to support the wheel on a recession of the substitute tread occurring in the event of deflation of the tire.

4. In a pneumatically-tired wheel, and in combination with a wheel rim and a pneumatic tire mounted thereon, guard plates secured to the rim and embracing the sides of the tire, said plates having supporting portions disposed on opposite sides of the tread surface of the tire, a supplemental tread slidably connected with said supporting portions and bearing on and movable with the tread surface of the tire, and flanges extending inwardly from said supporting portions and overlying the lateral margins of the supplemental tread and exposed for contact with the road surface to support the wheel in the event of deflation of the tire and recession of the supplemental tread.

5. In a pneumatically-tired wheel, and in combination with a wheel rim and a pneumatic tire mounted thereon, supporting members secured to the rim and arranged at opposite sides of the tire, and a tread structure overlying the tread of the tire and movably mounted on the supporting members so as to be movable inwardly and outwardly with the tire tread, said supporting members embodying means for limiting the inward and outward movements of the tread structure, including tread surfaces beyond which the tread surface of the tread structure normally projects, said tread surfaces of the supporting members being adapted for contact with the road surface to support the wheel on a recession of the tread structure occurring in the event of deflation of the tire.

6. In a pneumatically-tired wheel, and in combination with a wheel rim and a pneumatic tire mounted thereon and having a worn tread surface, guard plates adapted to be secured to the wheel rim so as to engage opposite sides of the tire and having peripheral supporting portions lying on opposite sides of the tread surface of the tire, a supplemental tread adapted to overlie the tread surface of the tire, and retaining rings engaging the lateral margins of said supplemental tread and movably holding the same in engagement with the peripheral supporting portions of the guard plates.

7. In a pneumatically-tired wheel, and in combination with a pneumatic tire and a channeled wheel rim having tire bead holding flanges, a frame or casing comprising annular side plates having supporting portions disposed opposite said flanges of the rim and outer supporting portions arranged at opposite sides of the tire tread, said frame or casing inclosing the tire with the exception of its tread surface, means fixed to the rim and lying at the outer sides of the tire holding flanges and detachably fastening the inner supporting portions of the plates thereto, a substitute tread structure seated on the tread surface of the tire and disposed between the outer supporting portions of the plates, and means detachably connecting the supplemental tread to said outer supporting portions of the plates.

8. In a pneumatically-tired wheel, and in combination with a pneumatic tire and its wheel rim, a frame or casing comprising guard plates secured to the rim and enclosing the tire with the exception of its tread surface, said plates having peripheral portions disposed on opposite sides of the tread surface of the tire, and a substitute tread comprising flexibly connected linked tread members bearing on the tread surface of the tire and carrier members including parts in holding engagement with the lateral margins of the tread members and parts mounted on said peripheral portions of the guard plates to connect the tread members therewith for inward and outward movements with said tread surface.

9. In a pneumatically-tired wheel, and in combination with a pneumatic tire and its wheel rim, a frame or casing secured to the rim and enclosing the tire with the exception of its tread surface, said frame or casing having tread supporting portions formed with guideways and lying on opposite sides of the tread surface of the tire, and a supplemental tread comprising a flexible band structure formed of linked units consisting of tread members and holding and guiding members including parts in holding engagement with the lateral margins of the tread members and parts lying beyond the lateral margins of the tread members and projecting inwardly from the flexible band structure and engaging the guideways in said supporting portions of the frame or casing.

10. In a pneumatically-tired wheel, and in combination with a pneumatic tire and its wheel rim, a frame or casing comprising annular guard plates secured at their inner peripheries to the rim and enclosing the tire with the exception of its tread surface, said plates having outer peripheral portions parallel with each other and disposed on opposite sides of the tread surface of the tire, a supplemental tread bearing on the tread surface of the tire bridging the space between said outer peripheral portions of the guard plates, and retaining means arranged between the lateral margins of the supplemental tread and the supporting portions of the plates and engaging said margins of the tread, said means being adapted to permit normal inward and outward movements of the supplemental tread with the tire tread and to be brought in contact with the road surface to support the wheel in the event of deflation of the tire and recession of the supplemental tread.

11. In a pneumatically-tired wheel, and in combination with a pneumatic tire and its wheel rim, a frame or casing secured to the rim and enclosing the tire with the exception of its tread surface, said frame or casing having flanged supporting portions disposed on opposite sides of the tread surface of the tire, inturned holding flanges on said supporting portions, and a supplemental tread bearing on the tread surface of the tire and having side portions disposed adjacent to and extending outward laterally beyond the lateral margins of its tread face and engaging said holding flanges on the supporting portions of the frame or casing and supported in operative position thereby.

12. In a pneumatically-tired wheel, and in combination with a pneumatic tire and its wheel rim, a frame or casing secured to the rim and enclosing the tire with the exception of its tread surface, said frame or casing having flanged peripheral portions disposed on opposite sides of the tread surface of the tire, and a supplemental tread bearing on the tread surface of the tire and in engagement with said flanged peripheral portions of the frame or casing, the flanges of said portions extending transversely of the wheel-forming surfaces for contact with the road surface to support the wheel in the event of deflation of the tire.

13. In a pneumatically-tired wheel, and in combination with a pneumatic tire and its wheel rim, a frame or casing secured to the rim and enclosing the tire with the exception of its tread surface, said frame or casing having flanged peripheral portions disposed on opposite sides of the tread surface of the tire, and a supplemental tread bearing on the tread surface of the tire having a tread surface of less width than the distance between the flanged peripheral portions of the frame or casing and also having lateral edge portions extending under the flanges of said peripheral portions of the frame or casing and connected with said portions so as to support the supplemental tread in position for inward and outward movements with the tire tread.

14. In a pneumatically-tired wheel, and in combination with a pneumatic tire and its wheel rim, a frame or casing comprising guard plates secured to the rim and enclosing the tire with the exception of its tread surface, said plates having peripheral portions disposed on opposite sides of the tread surface of the tire and formed with guideways and inwardly extending flanges, a supplemental tread bearing on the tread surface of the tire and comprising an annular series of linked units, and retaining elements on said units extending laterally beyond the tread surface of the supplemental tread and projecting under the flanges and engaging the guideways of the peripheral portions of the plates.

15. In a pneumatically-tired wheel, and in combination with a pneumatic tire and its wheel rim, a frame or casing comprising guard plates secured to the rim and enclosing the tire with the exception of its tread surface, said plates having flanged peripheral portions disposed on opposite sides of the tread surface of the tire, a supplemental tread bearing on the tread surface of the tire and comprising channeled metallic members each having a tread element mounted therein, lateral flanges on said members engaging the flanges of said peripheral portions of the guard plates for inward and outward movements with said tread surface, and retaining and guide elements on the metallic members of the supplemental tread slidably engaging the peripheral portions of the plates inwardly of the flanges thereon.

16. In a pneumatically-tired wheel, and in combination with a pneumatic tire and its wheel rim, a frame or casing comprising guard plates secured to the rim and enclosing the tire with the exception of its tread surface, said plates having flanged peripheral portions disposed on opposite sides of the tread surface of the tire, a supplemental tread structure bearing on the tread surface of the tire and comprising a tread carrier disposed between said peripheral portions of the guard plates and formed of linked members each carrying a renewable tread surface, lateral projections on the carrier members extending under the flanges of the peripheral portions of the guard plates, and bolts rigid with the carrier members and slidably engaging the peripheral portions of the guard plates.

17. In a pneumatically-tired wheel, and in combination with a pneumatic tire and its wheel rim, a frame or casing comprising guard plates secured to the rim and enclosing the tire with the exception of its tread surface, said plates having peripheral supporting portions disposed on opposite sides of the tread surface of the tire, and a supplemental tread bearing on the tread surface of the tire and disposed between said peripheral portions of the guard plates, said tread comprising an annular series of flexibly connected tread members, and holding means including parts engaging the lateral margins of the tread members and parts slidably connecting the tread members with the supporting portions of the guard plates.

18. In a pneumatically-tired wheel, and in combination with a wheel rim and a pneumatic tire mounted thereon, supporting members secured to the rim and disposed on opposite sides of the tire, and a tread structure resting on and movable inwardly and outwardly with the tread of the tire and supported by said supporting members, said supporting members and tread structure having relatively movable engaging surfaces at opposite sides of the tread structure operative to limit the outward movement of the tread structure under a predetermined air pressure in the tire and operative to limit the inward movement of the tread structure, the engaging surfaces of the supporting members including portions overlapping the lateral edges of the tread structure and forming fixed surfaces for contact with the road surface and on which the wheel may run in the event of deflation of the tire.

19. In a pneumatically-tired wheel for vehicles, and in combination with a channeled vehicle wheel rim having tire retaining flanges, a pneumatic tire having edge portions engaging said flanges, and guard plates disposed at opposite sides of and having curved surfaces bearing on the side walls of the tire, said plates being provided with inner portions disposed in spaced relation to the retaining flanges and with straight outer portions disposed on opposite sides of the tread portion of the tire and projecting radially therebeyond, lugs fixed to the outer surfaces of the retaining flanges and forming abutments for the said inner portions of the guard plates, means detachably connecting the inner portions of the guard plates to the lugs, a supplemental tread bearing on the tread portion of the tire, and a supplemental rim carrying the supplemental tread and detachably mounting the same on the straight outer portions of the guard plates, said supplemental rim having sliding engagement with said plate portions for inward and outward movements with the tread portion of the tire.

20. In a pneumatically-tired wheel for vehicles, and in combination with a channeled vehicle wheel rim having tire retaining flanges, and a pnuematic tire having edge portions engaging said flanges, guard plates disposed at opposite sides of and having curved body portions bearing on the side walls of the tire, said plates being provided with inner supporting portions disposed opposite and in spaced relation to the flanges and outer supporting portions disposed at opposite sides of the tread of the tire, and inclosing the tire between said flanges and tire tread, bracket members fixed to the flanges and forming abutments for the inner supporting portions of the guard plates, fastening means connecting the inner supporting portions of the guard plates with said bracket members, and a supplemental tread resting on the tread of the tire and connected to the outer supporting portions of the guard plates.

21. In a pneumatically-tired wheel, and in combination with a wheel rim having bead receiving flanges, and a pneumatic tire having beads engaging said flanges, a frame or casing comprising guard plates arranged on opposite sides of the tire and inclosing the tire, with the exception of its tread surface, said plates having inner peripheral portions disposed opposite the flanges of the rim and outer peripheral portions disposed opposite the lateral margins of the tread surface of the tire, means disposed between and fastening the inner peripheral portions of the plates to the flanges of the rim, a supplemental tread resting on the tread surface of the tire and having a tread surface and portions lying laterally beyond and radially inward of its tread surface, and connecting means between the supplemental tread and plates comprising parts embracing said portions of the supplemental tread lying laterally beyond and radially inward of its tread surface and movably holding the supplemental tread in engagement with the outer peripheral portions of the plates.

JULIUS KINDERVATER.